(12) United States Patent
Hohl (10) Patent No.: US 8,204,540 B2
(45) Date of Patent: Jun. 19, 2012

(54) WIRELESS TRANSFER OF DATA FROM A MOBILE DEVICE TO A SERVER

(75) Inventor: Fritz Hohl, Stuttgart (DE)

(73) Assignee: Sony Corporation, Tokyo (JP)

( * ) Notice: Subject to any disclaimer, the term of this patent is extended or adjusted under 35 U.S.C. 154(b) by 300 days.

(21) Appl. No.: 12/561,899

(22) Filed: Sep. 17, 2009

(65) Prior Publication Data
US 2010/0093273 A1 Apr. 15, 2010

(30) Foreign Application Priority Data
Oct. 9, 2008 (EP) .................................... 08166272

(51) Int. Cl.
*H04M 1/00* (2006.01)
(52) U.S. Cl. ............... 455/556.1; 455/518; 455/503; 709/219; 713/168
(58) Field of Classification Search ............... 455/556.1, 455/1, 7, 72, 403, 518, 503, 522; 709/203, 709/219; 713/168
See application file for complete search history.

(56) References Cited

U.S. PATENT DOCUMENTS

| 2003/0128272 | A1 | 7/2003 | Clough et al. |
| 2003/0157960 | A1 | 8/2003 | Kennedy |
| 2006/0168351 | A1 | 7/2006 | Ng et al. |
| 2006/0189349 | A1* | 8/2006 | Montulli et al. ........... 455/556.1 |
| 2007/0004436 | A1* | 1/2007 | Stirbu ......................... 455/503 |
| 2008/0022135 | A1 | 1/2008 | Gaya |

FOREIGN PATENT DOCUMENTS

| WO | WO 2007/035275 A2 | 3/2007 |
| WO | WO 2007/035275 A3 | 3/2007 |
| WO | WO 2008/033771 A2 | 3/2008 |

OTHER PUBLICATIONS

U.S. Appl. No. 12/828,715, filed Jul. 1, 2010, Hohl, et al.
"Apple (United Kingdom)—Time Capsule", http://www.apple.com/uk/timecapsule/, 1 page.
"Eye-Fi Memory Cards: Wireless Photo and Video Uploads Straight from your Camera to . . . ", http://www.eye.fi/, 2 pages.
"Apple (United Kingdom)—Time Capsule—Backup", http://www.apple.com/uk/timecapsule/backup.html, 1 page.
"How Does the Eye-Fi Card Work?", http://www.eye.fi/how-it-works/basics, 2 pages.
Mark Gibbs, "Eye-Fi Links Digital Cameras to Wi-Fi Nets", Network World, http://www.networkworld.com/columnists/2008/051308-gearhead.html, May 13, 2008, pp. 1-2.
Rich Brownon, "Apple Time Capsule (500GB)", Network Storage Reviews, CNET Reviews, http://reviews.cnet.com/network-storage/apple-time-capsule-500gb/4505-3382_7-328..., Mar. 3, 2008, pp. 1-4.
"Time Capsule Setup Guide", http://manuals.info.apple.com/en_US/Time_Capsule_Early2009_Setup.pdf, 38 pages.
Alan Stafford, "Eye-Fi Wireless Card for Digicams", Eye-Fi Card Review, Eye-Fi Card Storage Review, PC World, http://www.pcworld.com/reviews/product/30801/review/eyefi_card.html, Nov. 2, 2007, pp. 1-3.

* cited by examiner

*Primary Examiner* — Shaima Q Aminzay
(74) *Attorney, Agent, or Firm* — Oblon, Spivak, McClelland, Maier & Neustadt, L.L.P.

(57) ABSTRACT

The present invention relates to a mobile device for recording data that includes recording unit that records data, a memory that stores the recorded data, a detecting unit that detects a server that receives the recorded data via a wireless communication system, and a transmitting unit that automatically transmits recorded data to a detected server via the wireless communication system without any user interaction when the detecting unit detects the server.

11 Claims, 3 Drawing Sheets

WIRELESS TRANSFER OF DATA FROM A MOBILE DEVICE TO A SERVER

CROSS-REFERENCE TO RELATED APPLICATIONS

This application is based upon and claims the benefit of priority under 35 U.S.C. §119 from European Patent Application No. 08166272.8, filed Oct. 9, 2008, the entire contents of which is incorporated herein by reference.

BACKGROUND OF THE DISCLOSURE

1. Field of the Disclosure

The present invention relates to the wireless transfer of data recorded in a mobile device to a server, in particularly to a mobile device and a server enabling such a transfer.

2. Description of Related Art

The background of the invention is hereby the need to transfer data, i.e. data such as audio and/or video data or any other kind of data, recorded by a mobile device, such as a mobile phone, a mobile personal digital assistant, a digital camera and the like, to a home or office server in an easy and simple manner. Although the storage capacity of removable storage media for mobile as well as stand-alone devices is significantly increasing every year, there is still a need for users to be able to transfer recorded data to a home or office server or any other kind of server in a simple but effective manner, either when being at home or at the office, or while being away from home or the office in order to avoid the loss of the data on a removable memory card in order to clear storage space, etc. Although the prior art suggests some ways to copy data recorded in a mobile device to a home or office server, such as for example in WO 2007/035275 A2, US 2003/128272 A1, WO 2008/033771 A2 and US 2006/168351 A1, all the previously suggested solutions suffer from the problem that either the user needs to perform some action, the mobile device needs to be switched on or needs to be powered on in order to copy the data, or that the data are only copied so that the memory of the mobile device is still holding the data. Further, some of the prior art solutions only allow the copying of data from a mobile device to a predefined home or office server within the wireless range of the home or office server.

BRIEF SUMMARY OF THE DISCLOSURE

The object of the present invention is therefore to provide a simple but efficient possibility of transferring data recorded in a mobile device to a server.

The above object is achieved by a mobile device according to claim 1. The mobile device according to the present invention comprises recording unit adapted to record data, memory unit adapted to store recorded data, detecting unit adapted to automatically detect a wireless connection to a server adapted to receive the recorded data via a wireless communication system without any user interaction, and transmitting unit adapted to automatically transmit recorded data to a server via said wireless communication system without any user interaction when said detecting unit detects said wireless connection to said server.

Advantageously, the mobile device further comprises receiving unit adapted to receive confirmation information via said wireless communication system confirming the receipt of said data from said server, wherein said data are deleted from said memory unit after the receipt of said confirmation information. Advantageously, in this case, the transmitting unit is adapted to repetitively transmit said data until said confirmation information is received.

Further advantageously, the mobile device of the present invention has an on-mode in which the mobile device is powered on and an off-mode in which the mobile device is powered off, completely, and a standby-mode in which the detecting unit is able to detect said wireless connection to said server, wherein all other functions of the mobile device are powered off in said standby-mode. In this case, advantageously, the detecting unit is a wake-up module adapted to power up at least the transmitting unit in order to transmit said data when receiving a signal from said server via said wireless communication system.

Further advantageously, the detecting unit is only powered on if data to be transmitted to said server are stored in said memory unit.

It is to be noted that the mobile device according to the present invention can be any kind of mobile or portable device, apparatus and so forth adapted to record or sense data of any kind and to store the recorded or sensed data in a memory unit. For example, but not limited, the mobile device could be a portable or mobile telephone, a portable or mobile personal digital assistant, a portable or mobile digital camera for recording still and/or moving pictures, a portable or mobile recorder for recording audio data and the like. The recorded or sensed data may include audio data, video data or any other data which can be recorded in any kind of format by suitable recording or sensing unit. The recording unit could be any kind of suitable module, element, device, unit and so forth adapted to record such data. The memory unit of the mobile device, which is adapted to store the recorded data, could be any kind of suitable memory unit, device, storage unit or device which could either be a fixed part of the mobile device or could be a removable part, such as a memory card, a memory stick and the like.

The above object is further achieved by a server according to claim 7. The server is adapted to receive and record data from a mobile device according to the present invention and comprises receiving unit adapted to automatically receive data from the mobile device of the present invention via a wireless communication system without any user interaction, memory unit adapted to store the data received from the mobile device via said wireless communication system, and transmitting unit adapted to transmit confirmation information confirming the receipt of said data to said mobile device via said wireless communication system. Hereby, after the server successfully received the data from the mobile device, it transmits confirmation information to the mobile device according to the present invention via the wireless communication system in order to indicate the successful receipt of the data and in order to enable the mobile device to delete the successfully transferred data from its memory unit.

The server according to the present invention adapted to wirelessly receive data recorded from the mobile device can either be a relay server adapted to receive the data in a wireless communication system and to forward or transmit the data to a home or office server via a wired communication system, or could be a home or office server. In case that the server is a relay server, it comprises transmitting unit adapted to transmit the data stored in the memory device and previously received from the mobile device via a wireless communication system to a specific server allocated to said mobile device via a wired or wireless communication system. Thus, the relay server is adapted to communicate in a wireless communication system with a mobile device according to the present invention and via a wired or wireless communication system with a specific server, i.e. a home server, an office server or the like, which is specifically allocated to the mobile device. Advantageously, the relay server comprises receiving unit adapted to receive confirmation information confirming the receipt of said data from said specific server via the wired communication system after transmitting the data to said specific server, wherein the data are deleted from the memory unit of the relay server after receiving the confirmation information from the specific server. Advantageously, the communication between the relay server and the mobile device bases on a local transfer protocol and the communication between the relay server and the specific server bases on a remote transfer protocol.

As mentioned above, the server which is adapted to wirelessly communicate with the mobile device of the present invention could also be a home or office server, i.e. a specific server specifically allocated to the mobile device, and comprising confirmation unit adapted to provide said confirmation information after receiving the data from the mobile device. In this case, after the data were successfully, i.e. completely and correctly received in the specific server, the specific server sends confirmation information to the mobile device via the wireless communication system in order to allow the mobile device to delete the data and clear its memory unit. Advantageously, the wireless communication between the specific server and the mobile device bases on a local transfer protocol.

The above object is further achieved by a server being a specific server allocated to the mobile device and adapted to receive data from a relay server. In this case, the specific server comprises receiving unit adapted to receive data from a relay server according to the present invention via a wired communication system, memory unit adapted to store the data received from the relay server, confirmation unit adapted to provide confirmation information confirming the receipt of the data from the relay server, and transmitting unit adapted to transmit the confirmation information to the relay server via the wired communication system. Thus, after successfully receiving the data, the specific server sends the confirmation information to the relay server, which can then delete the data from its memory. Advantageously, the communication between the specific server and the relay server bases on a remote transfer protocol.

The specific server as well as the relay server according to the present invention may be implemented in any kind of suitable way, for example as a standalone device or apparatus, or as a part of a larger unit. For example, the specific server could be a personal computer located in a home or in a business environment. The wired communication system in which the communication between the relay server and the specific server could take place could be any kind of fixed line communication system, for example the internet, an intranet, such as an Ethernet or the like, a cable network, a telephone line network or any other kind of suitable fixed line network, or any kind of combination and/or composition of such networks with any kind of wireless communication system. The wireless communication system in which the communication between the mobile device and the specific server or the relay server takes place and in which the communication between the relay server and the specific server could take place, it could be any kind of suitable wireless network comprising present and future wireless communication systems, such as limited to WiFi, WiMediaUWB, Bluetooth, wireless HD, IEEE 802.15.3c and so forth.

The transmitting unit and receiving unit adapted to transmit and receive data via the wireless communication system in the specific server or the relay server could be implemented as separate units, devices, modules or could be implemented as a transceiver unit, module, element, unit and so forth adapted for the communication in the wireless communication system. The transmitting unit and receiving unit the relay server or the specific server adapted to communicate in the wired communication system could also be implemented as separate elements, modules, units, or it could be implemented in respective transceiver unit, unit, elements and so forth. The memory unit of the specific server and a relay server may be any kind of suitable memory or storage element, unit, device, including explicitly installed memory unit as well as removable memory unit.

The present invention is further directed to a communication system comprising a mobile device according to the present invention as well as a specific server, as well as to a communication system comprising a mobile device, a relay server as well as a specific server. Further, the present invention is directed to a communication method between a mobile device of the present invention as well as a specific server of the present invention, as well as to communication method between a mobile device and a relay server of the present invention and the relay server and a specific server according to the present invention.

The present invention provides a simple but very efficient solution to transfer data recorded in a mobile device to a home or business server specifically allocated to the mobile device, eventually via a relay server. Hereby, the present invention is specifically advantageous since it allows the automatic transfer of data recorded in a mobile device automatically without requiring any kind of user interaction or user input to the mobile device. Hereby, the user does not even need to take notice of the transfer of the data from the mobile device to the specific server or the relay server, since the mobile device, upon detection of a suitable relay server or the specific server in its wireless range (which already takes place automatically without any kind of user interaction or input to the mobile device), automatically transfers the data without asking the user for any kind of user input. Even when the mobile device is buried in the pockets of the jacket or in a backpack or the like of a user, and/or while the user is moving with its mobile device, as soon as the detecting unit detects the suitable relay server or specific server, the transfer of the data is performed. The mobile device according to the present invention can even be powered off except the detecting unit which continuously or in specific predetermined intervals searches for a suitable relay server or its specific server in its wireless range and, upon a successful detection, switches the mobile device or at least the functionalities which are necessary to transfer the data on. Therefore, the present invention has the additional advantage of saving power in the mobile device, which is usually battery or accumulator operated. Further, since the data is not only copied or synchronized from the mobile device to the relay server or the specific server, but since the data is deleted from the memory unit of the mobile device (and eventually the relay server) after receiving a confirmation information from the specific server that the data have been successfully received in the specific server, the memory unit of the mobile device can be emptied and is ready to store new data recorded by the recording unit of the mobile device.

Since the present invention not only allows the transfer of data from a mobile device directed to a specific server while being in the wireless range of the specific server, but also allows the transfer of data via a relay server, the present invention enables the implementation of a system in which data are transferred from a mobile device to a specific server even when the mobile device is far away from its specific server, which is a home or a business server as explained.

The present invention is a system in which a device that is switched off from a user point of view automatically transfers pictures to a server as soon as the device comes into range of e.g. an AccessPoint. From a users point of view, it is a benefit as the user does not need to know that he/she is in range of an AccessPoint, the user does not need to remember to switch on the camera in order to have the pictures transferred, the user does not need to wait until the transfer is completed, the user does not need to check whether the transfer was completed, and/or the user does not need to switch the device off after the transfer.

Additionally, this difference allows to save battery. In a system where the user has to switch on the device in order to start the transfer the system never knows whether it can switch off some components as the system cannot differentiate between the "general on state" and the "transfer only on state".

The expression "specific server specifically allocated to a mobile device" is intended to cover any kind of situation in which the specific server, i.e. home server or business server or any other suitable server, has knowledge, i.e. by unit of a pre-stored identification of the mobile device or the like, about the mobile device which may transfer data in the future. On the other hand, the mobile device knows to which specific server it is supposed to send the recorded data, for example by knowing the location address, the identification, the network address and/or any other necessary information so that the data can be transferred from the mobile device to the specific server.

As mentioned above, the present invention enables the transfer of data from a mobile device to a specific server either in a local scenario in which the mobile device and the specific server are co-located and connected via the wireless communication system, or in a remote scenario in which a mobile device and a relay server are co-located and connected via the wireless communication system, and in which the relay server and the specific server are connected via a wired communication system. Specifically, the present invention hereby enables the transfer of data on the mobile device to the specific server even in situations in which the direct wireless connection in the wireless communication system may be unreliable, short ranged and/or have temporary and short interruptions, whereby the relay server is operated by a third party which can not necessarily be trusted, wherein the delay on the wired connection between the relay server and the specific server can be high, and/or wherein the specific server in the remote scenario might be temporarily unavailable. In order to overcome these problems, the present invention suggests to base the wireless communication between the mobile device and the relay server or the specific server on a local transfer protocol. The local transfer protocol is hereby a stateless message-based system which is typically located at OSI layer 2 that allows the transfer data from the mobile device to either the specific server (in the local scenario) or to the relay server (in the remote scenario). The local transfer protocol hereby deals and overcomes the problems that occur from possibly using an unreliable wireless connection. The present invention further suggests to use a remote transfer protocol for the wired communication between the relay server and the specific server in the remote scenario. The remote transfer protocol is hereby a stateless message-based system which is typically located at OSI layer 3 that allows to transfer data from the relay server to the specific server. Hereby, the remote transfer protocol mainly transports local transfer protocol messages from the specific server to the mobile device and from the mobile device to a specific server by wrapping these messages in remote transfer protocol messages. The remote transfer protocol mainly deals and overcomes the problems of large delays in the data communication from the relay server to the specific server and with the fact that the specific server is or may often not be available during some periods.

BRIEF DESCRIPTION OF THE DRAWINGS

The present invention is further explained in the following description of preferred embodiments in relation to the enclosed drawings, in which.

DETAILED DESCRIPTION

Figure 1:
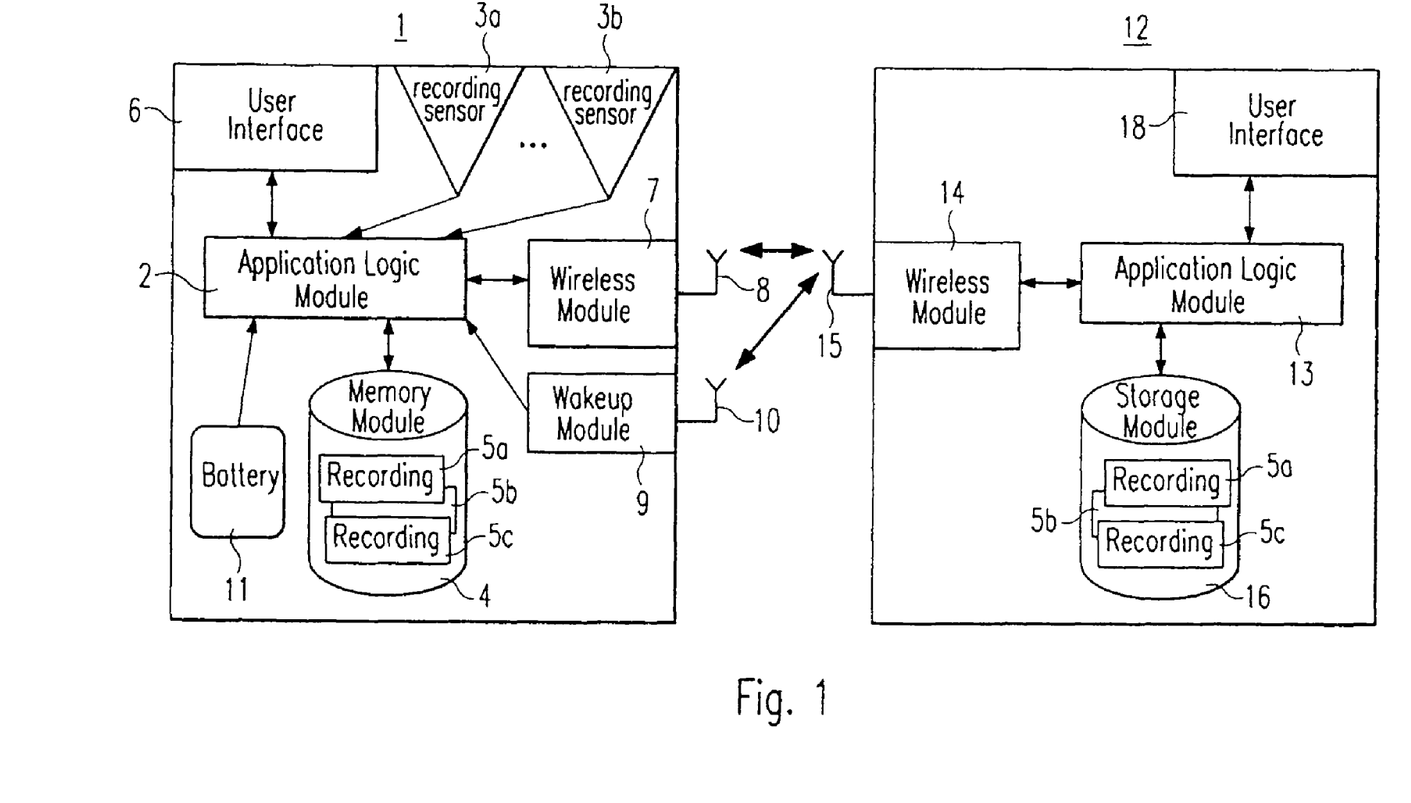
FIG. 1 shows schematic block diagrams of a mobile device and a specific server according to the present invention.
Figure 2:
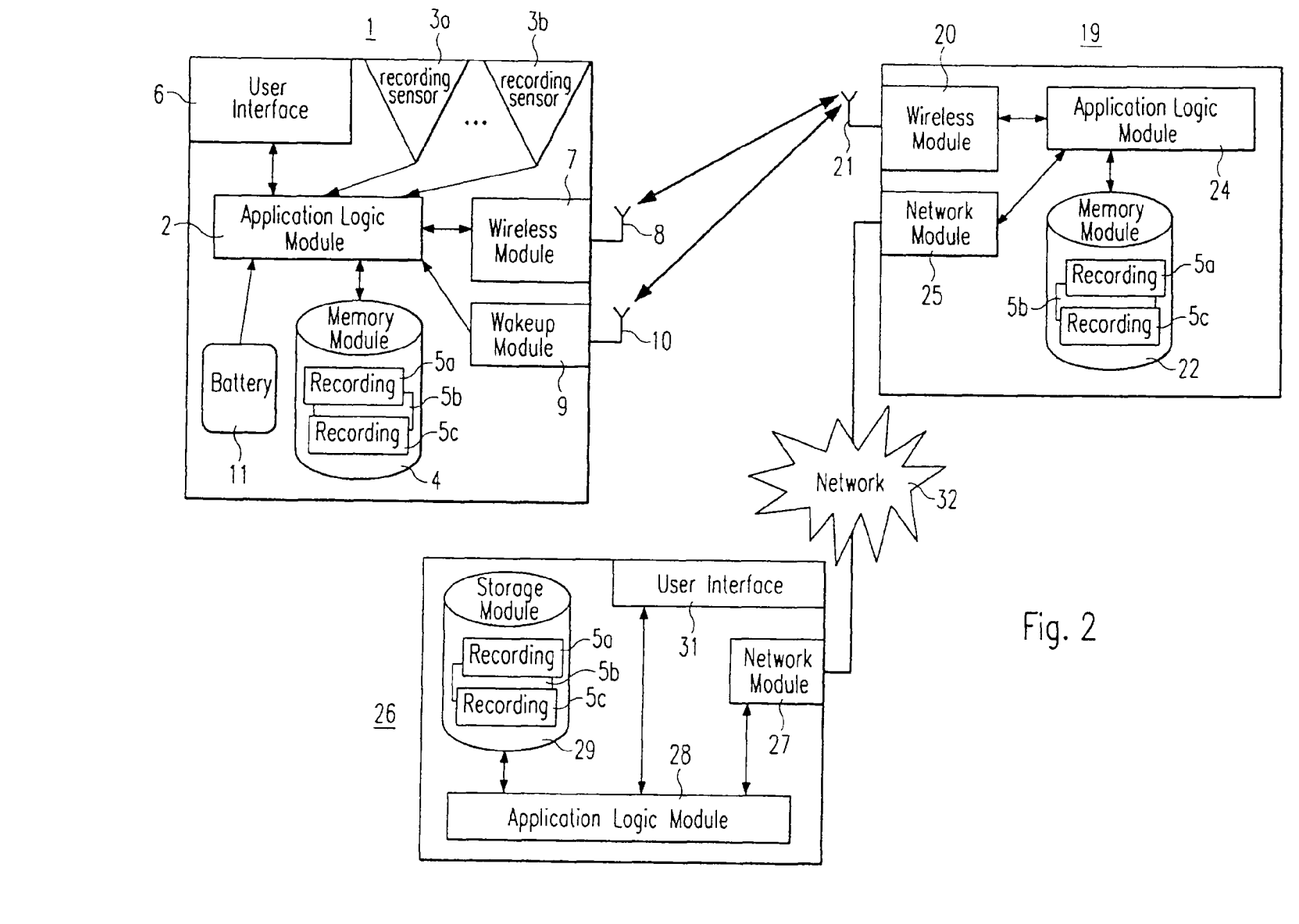
FIG. 2 shows block diagrams of a mobile device, a relay server and a specific sever according to the present invention.

As mentioned above, the present invention involves a mobile device 1, a specific server 12; 26 (which can be e.g. a home or office server, but will be called home server in the following) and optionally a relay server 19, schematic block diagrams of which are shown in FIGS. 1 and 2.

The mobile device 1 records data by using one or more recording sensors or unit 3a, 3b (e.g. a photo sensor, a microphone or the like). These data are stored in the memory module or unit 4 of the mobile device. The target of this invention is to move these recorded data 5a, 5b, 5c into the storage module or unit 16; 29 of a home server 12; 26. "Moving" unit that the data shall disappear at the one side and appear at the other side. For some configurations a third device, the relay server 19 mediates the data between the mobile device 1 and the home server 12; 26. Mobile device 1 and home server 12; 26 are assumed to be operated by the same party whereas the relay server 19 is typically operated by a $3^{rd}$ party. In order to support the interests also of the relay operator to provide the relay service, different compensation mechanisms such as billing or advertisments are supported.

The system architecture can be depicted for at least two different configurations. In the first case as shown in FIG. 1, a local configuration is used where the mobile device 1 and the home server 12 are connected directly via a wireless link. For that purpose the home server 12 has to also include a wireless module or unit 14.

In the second case, as shown in FIG. 2, a remote configuration is used where the mobile device 1 and the home server 26 do not communicate directly via a wireless link. Instead, the mobile device 1 communicates directly to the relay via a wireless link. In turn, the relay server 19 communicates with the home server 26 via a different network (that might be wireless or wired). To that end the relay server 19 includes a wireless module or unit 20 and a network module or unit 25, while the home server 26 needs (apart from the other components) only a network module 27 (but might optionally have an additional wireless module).

The mobile device 1 of the present invention comprises an application logic module 2, which can be any kind of suitable control unit adapted to control the various components and elements of the mobile device 1. The mobile device 1 further comprises a memory module or unit 4 adapted to store data recorded by one or more recording unit 3a, 3b. The mobile device 1 further comprises a battery unit 11 which is adapted to provide various elements of the mobile device 1 with the necessary power. Further, the mobile device 1 comprises a wireless module 7 which is a communication unit adapted to transmit and receive data via an antenna 8 in a wireless communication system. The wireless module 7 is controlled by the application logic module 2. Optionally, the mobile device 1 may comprise a wakeup module 9 connected to an antenna 10, whereby the wakeup module 9 is adapted to detect the presence of a home server 12 or a relay server 19. Alternatively, the presence of a home server 12 and a relay server 19 could also be detected by the wireless module 7 in cooperation with the application logic module 2. Further, the mobile device 1 comprises a user interface 6, which could comprise the necessary input keys, keyboard or the like enabling a user to input instructions information, as well as output components, for example audio or video output components through which the mobile device 1 enable to output acoustic or visual signals to the user. In the following, the various components of the mobile device 1 are explained in more detail.

The application logic module (MD-ALM) 2 controls the mobile device 1. As such it e.g. uses the output of the recording sensors 3*a*, 3*b* to created data recordings that it stores in the memory module 4, is woken up by the WakeUp module 9 (if present) in case the nearby presence of a wireless module enabled device (e.g. home server 12 or relay server 19) is detected, moves data recordings to a home server 12; 26 (possibly via a relay) server 19 via a local transfer protocol, uses the information on the current battery level to e.g. ensure to keep enough power to move data recordings to a home server 12; 26, and handles the communication with the user using the user interface 6.

The memory module 4 stores the data recordings 5*a*, 5*b*, 5*c* before they are moved to the home server 12; 26. It is assumed that the size of the memory module 4 is smaller than the size of the storage module 16; 29 in the home server 12; 26.

The user interface (MD-UI) 6 enables the communication of the mobile device 1 (i.e. the application logic module 2) with the user. It includes output and input unit for audio, video or any other kind of information.

The wireless module (MD-WM) 7 handles the wireless connection between the mobile device 1 and the home Server 12 (in the local case) or the relay server 19 (in the remote case). In case the WakeUp module 9 is not present it also includes functionality to discover or detect the wireless module 14 of the home server 12 or the relay server 19. Technology-wise a broad range of existing and upcoming systems for the wireless module are possible, e.g. WiFi, WiMedia UWB, Bluetooth, WirelessHD, IEEE802.15.3c, and so on.

The battery (MD-B) 11 is an energy storage that powers the mobile device 1. Its battery level can be read by the application logic module 2.

The WakeUp module (MD-WUM) 9 is an optional component which allows to detect the presence of a nearby device using a wireless module 14; 20 (e.g. a relay server or a home server). If this event is detected the WakeUp module 9 can power on other components (e.g. the application logic module 2). This advanced feature may allow for more optimized (lower) power consumption in case no nearby wireless module is present at a certain location and/or time.

The recording sensors (MD-RS) 3*a*, 3*b* allow to create a data recording using the combined output of the sensors.

The home server 12; 26 is shown in FIGS. 1 and 2 essentially comprises an application logic module 13; 28, which is a suitable control element adapted to control the modules and elements of the home server 12; 26. Further, the home server 12; 26 comprises a storage module 16; 29 which is a suitable storage or memory unit adapted to store the data received from the mobile device 1. Hereby, in the local case as shown in FIG. 1, the home server 12 comprises a wireless module 14 which is controlled by the application logic module 13 and connected to an antenna 15. The wireless module 14 is a suitable communication unit adapted to transmit and receive data to and from the mobile device 1 in a wireless communication system. In the remote case as shown in FIG. 2, the home server 26 comprises a network module 27 controlled by the application logic module 28. The network module 27 is adapted to communicate with a relay server 19 by unit of a wired or wireless communication system or network 32. Further, the home server 12; 26 comprises a user interface 18; 31 through which a user is able to input data and which is also able to output audio and/or video information to a user. The various elements of the home server 12; 26 are explained in more detail in the following.

The application logic module (HS-ALM) 13, 28 controls the home server 12; 26. As such it e.g. receives data recordings from the mobile device 1 (possibly via a relay) via a local transfer protocol and stores them on the storage module 16; 29, and handles the communication with the user.

The network module (HS-NM) 27 handles the network connection between a relay server 19 and a home server 26 in the remote case. It can be realized by a wired network technology, e.g. Ethernet or the like, or by a wireless one such as WiFi (IEEE802.11) or the like. Typically it will allow for a wide area connection such as one via the internet.

The storage module (HS-SM) 16; 29 finally stores the data recorded at the mobile device 1. After the successful storage of a complete error-free data recording it is assumed to be safe to delete the original data recording at the mobile device 1 in the local case (as well as in the relay server 19 in the remote case). It is assumed that the size of the memory module 4 in the mobile device 1 is smaller than the one of the storage module 16; 29 in the home server 12; 26.

The user interface (HS-UI) 18; 31 enables the communication of the device (i.e. the application logic module 13; 28) with the user. It includes audio and/or video output and input unit.

The wireless module (HS-WM) 14 handles the wireless connection between the mobile device 1 and the home server 12 in the local case. Technology-wise a broad range of existing and upcoming systems for the wireless module are possible, e.g. WiFi, WiMedia UWB, Bluetooth, WirelessHD, IEEE 802.15.3c, and so on.

The relay server 19 as shown in FIG. 2 comprises an application logic module 24 which is any kind of suitable control module or unit adapted to control the elements of the relay server 19. Further, the relay server 19 comprises a memory module or unit 22 adapted to store received data from the mobile device 1. The application logic module 24 controls the memory module 22. Further, the relay server 19 comprises a wireless module 20 connected to an antenna 21 and controlled by the application logic module 24. The wireless module 20 is any kind of suitable communication unit adapted to transmit and receive data or instructions to and from the mobile device 1 in a wireless communication system. Further, the relay server 19 comprises a network module 25 controlled by the application logic module 24 and adapted to communicate with the home server 26 via a wired or wireless network 32. The components of the relay server 19 are explained in more detail in the following.

The application logic module (R-ALM) 24 controls the relay server 19. As such it e.g. receives data recordings from the mobile device 1 via a local transfer protocol, stores the data recordings temporarily in the memory module 22, moves data recordings to a home server 26 via a remote transfer protocol, and relays messages from the home server 26 to the mobile device 1.

The network module (R-NM) 25 handles the network connection between the relay server 19 and the home server 26. It can be realized by a wired network technology, e.g. Ethernet or by a wireless one such as 802.11. Typically it will allow for a wide area connection such as one via the internet.

The memory module (R-MM) 22 stores the data recordings 5a, 5b, 5c after they have been received from the mobile device 1 and before they are moved to the home server 26. Due to different data rates and delays between the relay server 19 and the mobile device 1 and between the relay server 19 and the home server 26 it might be advantageous to have the size of the memory module in the relay server 19 similar to the one in the mobile device 1 or to a multitude of this size in order to serve a multitude of mobile devices 1 at the same time.

The wireless module (R-WM) 20 handles the wireless connection between the mobile device 1 and the relay server 19. Technology-wise a broad range of existing and upcoming systems for the wireless module 20 are possible, e.g. WiFi, WiMedia UWB, Bluetooth, WirelessHD, IEEE802.15.3c, and so on.

The present invention implements a "unawareness" usage paradigm—i.e. apart from the initial configuration, the user of the mobile device 1 does not have to know when to start the application or actions within the application (and therefore also does not have to know how these actions are started), does not have to wait until actions within the applications are finished, does not have to bring the mobile device 1 in a certain situation in order for the application to work (i.e. especially does not have to take the mobile device 1 out of a backpack, pocket etc., and does not have to orientate the mobile device 1 towards a home server 26 or relay server 19)

In summary, the user does not have to care about the application once it is configured. In that sense the user can be unaware of the application.

As this usage paradigm must not mean that the user loses the control over the effects of the application and in order to prevent unwanted surprises, two new principles are needed, namely first to inform the user about the course of the application the next time the user switches on the mobile device, and second to provide unit for the user to roll back or compensate the effects and results of the application whenever possible.

As an illustration of these principles the following dialogs on a still picture camera (as an example of a mobile device 1) with an integrated automatic data transfer application according to the present invention could appear when the user switches on the camera the next time after some still pictures were moved from the camera to a home server 12 or a relay server 19.

In a first step the user would be informed by a corresponding display message that during the mobile device 1 was switched off, it managed to move a number of pictures to a home server 12 or a relay server 19. The user can now either watch the pictures on the camera that have been moved if they are still existing in the camera (for moving them they have been erased from the camera, but typically such a removal is a logical one that allows to re-use the memory space of a removed file, not a physical removal or replacement until the space is really re-used). In addition the moved pictures can be restored at the camera if they still exist in the camera if the user inputs a corresponding instruction.

Without additional mechanisms, the mobile device 1 would typically spent most of the time trying to find a wireless network/home server 12 or relay server 19 and this activity also typically uses most of the battery of the mobile device 1. One approach to save parts of this power is to get additional information from the user in order to restrict the find-a-network time period. For example, before switching of the mobile device 1, the user could input the time period during which the mobile device 1 will be away from the home server 12 or a relay server 19, or input the time point when the mobile device will be in read of these servers again.

When the MD-ALM notices that although there is at least one recording in the MD-MM, no suitable wireless network or home server 12 was detected over some time, it asks the user the next time the user switches on the device whether the user is absent from home for a longer time and if so, when the user intends to come back. Until then also the MD-WUM (or MD-WM if no MD-WUM exists) can be powered off given the MD-WUM (MD-WM) can be powered on at that time by a component that uses less power than the MD-WUM (MD-WM) itself.

As the data recordings a user creates in a mobile device 1 might have private character, the user not only requires privacy of the data recordings during transmission (no $3^{rd}$ party must be able to play the data recordings), integrity of the data recordings (no 3rd party must be able to alter the data recordings), and atomicity of the data recordings move (i.e. either the data recording is really stored at the home server 26 or it rests at the mobile device 1 excluding the case that a data recording can get lost in between) but the user also requires that only the specified home server 12; 26 gets the data recordings in a readable form.

Therefore, it is important to let the user identify one or more target home servers 12; 26 as the instance that shall be allowed to be the destinations of the data recordings move, i.e. to store such identification information in the mobile device 1.

In addition it is sometimes desirable that only the specified mobile device 1 can send data recordings to the home server 12; 26 (e.g. in order to avoid HS-SM overload), but that is often not really important to the user.

Apart from specifying the target home server 12; 26 it makes sense for some network technologies to also specify the target network as e.g. for WLAN, a specific network can be seen before a specific server in the network can be found. Therefore, a first check can verify the target network the home server 12; 26 is supposed to be a member of, and then a second check can verify the target home server. This only holds true for the local case. In the remote case the mobile device 1 might need to connect to an unknown-in-advance network in order to connect to an unknown-in-advance Relay server 19 that then in turn contacts the target home server 26. Therefore, if the mobile device 1 is set to use possibly a relay server 19, it does not check for a target home server 26 after having optionally checked for a target network, but it checks for the existence of a willing relay server in any network it finds along the way. The set of networks to check can be restricted by some information provided by a relay-service subscription plan so a mobile device 1 might decide on finding a network whether it is worth to check for a willing relay server 19 or not.

Different Flows

Figure 3:
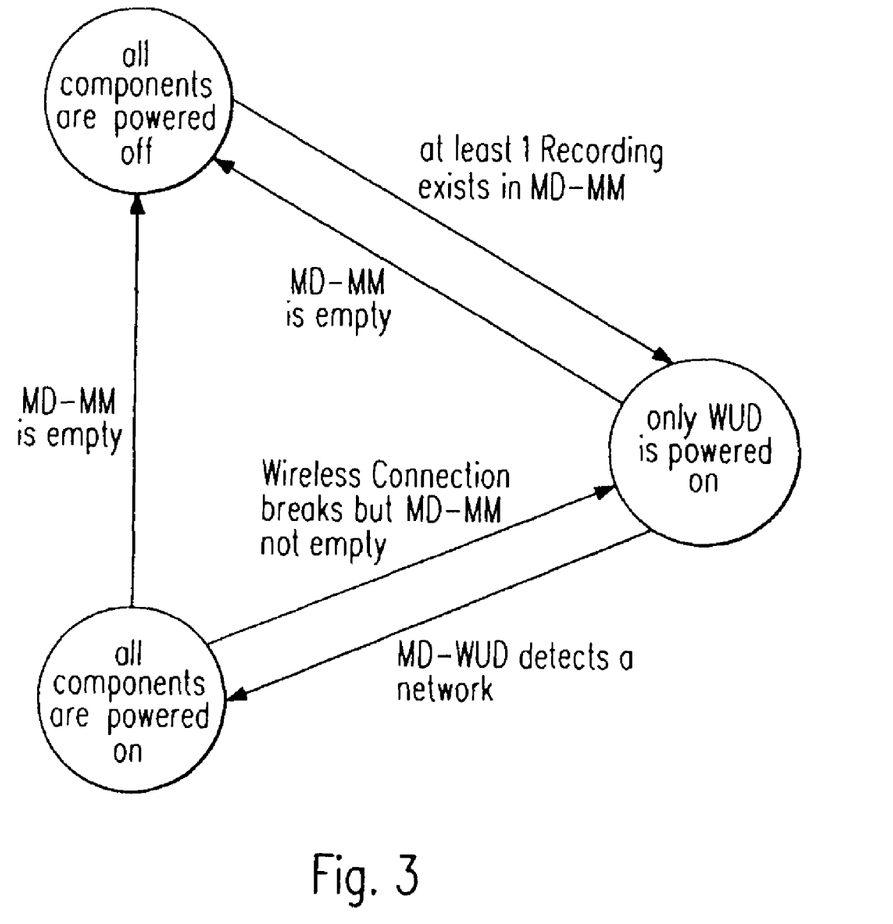
FIG. 3 shows the power states of the mobile device in a schematic diagram.

In order to illustrate the invention, we will now have a look on how the invention works in case of different situations. To that end we will use the state diagram as shown in FIG. 3 that shows the power states of components at the mobile device 1 for the automatic data transfer mode (a user can switch on a mobile device 1 at any time). If the user does not have the mobile device 1 switched on, the following diagram holds true.

There is No Recording on the Mobile Device 1

If there is no data recording stored in the MD-MM 4, the mobile device 1 does not need to power on any module for the automatic transfer of data (of course the user can switch on the mobile device 1 at any time) because there is no activity needed yet.

A User Takes a Recording on a Mobile Device 1

The user takes a data recording that is then stored in the MD-MM 4. After the first data recording is stored, the MD-ALM 2 switches on the MD-WUM 9 in order to find relay servers or home servers if the MD-ALM 2 does not decide that this search can be postponed. If the MD-WUM 9 is powered-on it stays on even if the mobile device 1 is switched off by the user.

In case a MD-WUM 9 does not exist in the mobile device 1, the MD-WM 7 is used in the same manner being in a device discovery mode (i.e. the mode that allows to find networks the mobile device 1 can connect to).

A Mobile Device 1 Comes in Range of a Home Server 12

If the MD-WUM 9 is switched on and the mobile device 1 comes into range of the HS-WM 14, the MD-WUM 9 states this after a while and powers on the MD-ALM 2 and the MD-WM 7. Depending on the local transfer protocol the MD-ALM 2 using the MD-WM 7 either first verifies the existence of the target network and/or the existence of the target home server 12 before it starts transferring the data recordings. Or it immediately starts the transfer, verifying the target network and or home server 12 along the way. If no target network/home server 12 is found, the system falls back in the state before, i.e. all modules except the MD-WUM 9 power off.

If there is no MD-WUM 9, but only a MD-WM 7 then the MD-WM 7 informs the MD-ALM 2 as soon as the target network and/or target home server 12 is within communication range and then the local transfer protocol takes over. Generally, the MD-ALM 2, before starting a data transfer to a home server 12 or a relay server 19, could optionally check the power status of the battery 11 and could not transfer data if the battery level is below a prescribed threshold. For example, if the remaining power is not sufficient to transfer all data, no data transfer is initiated. Also, e.g. if the remaining power is needed for the other functionalities of the mobile device, e.g. recording of data, then no data transfer is initiated. The task of the local transfer protocol is to transfer the data recordings to the home server using the wireless connection and to signal the safe storage of a data recording to the MD-ALM 2. After having received this signal in form of a confirmation information from the home server 26 (e.g. generated or provided by the HS-ALM 13 after successfully receiving the data), the MD-LM 2 can remove the corresponding data recording from the MD-MM 4.

When all recordings have been moved, the communication is ended, and all components of the mobile device 1 power off.

When the wireless connection breaks (because e.g. the user walked outside the range of the connection), and if there is at least one data recording that has not been already moved, after some time all component of the mobile device 1 except the MD-WUD 9 are switched off. If there is no MD-WUM 9, but only a MD-WM 7 then only the MD-WM 7 remains powered on.

A Mobile Device 1 Comes in Range of a Relay Server 19

This flow is similar to flow 3) with the following differences:

The mobile device 1 communicates wirelessly with the relay server 19, not the home server 1

When receiving data recordings from the mobile device 1 the relay server 19 transmits them via the remote transfer protocol to the home server 26. This may happen at any time, even if the mobile device 1 has no wireless connection to the relay server 19 anymore The mobile device 1 still can remove a data recording from its memory module 4 only if it was stored safely at the home server (not the relay), or alternately, after it was stored safely at the relay server 19.

Therefore, a data recording stored at the R-MM 16 can be removed at any time In order to allow for one way of compensating the service of the relay operator, the invention allows for insertion of data recordings towards the set of data recordings transferred to the home server.

1) In the Following, an Example Description of the Local Transfer Protocol (LTP) is Given.

The local transfer protocol is the system that allows to transfer data recordings from the mobile device 1 to either the home server 12 (if no relay server is involved) or to the relay server 19 (in contrast to the remote transfer protocol (RTP) that allows to transfer data recordings or parts of it from the relay server 19 to a home server 26).

As the first prerequisite to the LTP it is assumed that the wireless connection has already been established, i.e. devices can send messages to each other. For a Bluetooth-type of wireless network this might e.g. mean that pairing took place already. For an access-point-mode WLAN-type of wireless network this might mean that the access point allowed the mobile device to the network, maybe even that the process of acquiring an IP address for the mobile device already took place.

The second prerequisite is that mobile device 1 and home server 12 already have selected each other, i.e. they know each others IDs and have exchanged a secret key.

The LTP is a message-based stateless protocol. Every message is allowed at every point of time.

1.1 Data Structures

These data structures are used within the protocol messages.

Name: Local-ID
Elements:
    32 bits number
Semantics: The local ID of the device (comparable to an Ethernet address).
Name: MD-ID
Elements:
    Local-ID: The local ID of the device (comparable to an Ethernet address)
Semantics: The ID of a mobile device 1.
Name: SD-ID
Elements:
    Local-ID: The local ID of the device (comparable to an Ethernet address)
    Global ID: The ID of the device that can be used to address the device in the Internet. This (arbitrarily sized) ID could be e.g. a DNS address.
Semantics: The ID of a home server 12 or relay server 19.
Name: Media-ID
Elements:
    Local-ID: The local ID of the device issuing the media ID (typically the one that recorded the item)
    32 bits number: managed by the issuing device
Semantics: The ID of a media item (i.e. a recording).
Name: Data Chunk
Elements:
    Data portion of a certain specified size
Semantics: A data recording is subdivided into a series of data chunks. All data chunks e.g. have the same size. If the overall size of a data recordings is unequal a multitude of chunk size, the last chunk is padded with random data to the nominal size of a chunk. The size of a chunk is typically selected in a way that it (plus the needed additional data) can be transmitted in one packet over the wireless connection.
Name: Chunk-ID
Elements
   Media-ID: The ID of a media item (i.e. a recording)
   32 bits number: The ID of the chunk inside the media item
Semantics: The ID of a media item (i.e. a recording) chunk.
Name: Complex List
"complex list" is a data entity that is defined as follows:
Complex list=(ChunkID|ChunkSequence|MediaID|MediaSequence) {";" Complex list}
ChunkSequence="b" ChunkID "-" ChunkID
MediaSequence="d" MediaID "-" MediaID
   This unit that a "complex list" is a sequence of ChunkIDs and ChunkSequences. A ChunkSequence is an abbreviation of a consecutive sequence of ChunkIDs from a start ChunkID to an end ChunkID.
1.2 Variables
   CONNECTIONTIMEOUTPERIOD: the amount of time a device accepts a connection to be interrupted. The longer the CONNECTIONTIMEOUTPERIOD the longer connection interruptions can be handled.
   FINDINTERVALL: the periodicity as an interval a device is trying to find another device. The longer the FINDINTERVALL, the slower another device is found and the less often the finding device needs to issue the find action.
   FINDPERIOD: the amount of time a device is trying to find another device. The longer the FINDPERIOD the longer a device that wanted to be find can take in order to react on find actions. Obviously, the FINDINTERVALL is smaller or equal than the FINDPERIOD, and the FINDPERIOD is a multitude of FINDINTERVALL.
1.3 Messages from the Mobile Device 1
   The messages that can be sent from the mobile device 1 to the home server 12/relay server 19 under the control of the MD-ALM 2 of the mobile device 1 are the following ones.
Name: RSVP
Parameters: —
Semantics: The MD asks all FlashSync-enabled home servers 12 and relay server 19 in range to react with an "I'm here" message.
Name: Are you there?
Parameters:
   SD-ID: the SD-ID of a relay or home server
Semantics: The MD 1 asks the device with the SD-ID to react with an "I'm here" message.
Name: Where was I?
Parameters:
   SD-ID: the SD-ID of a home server 12
Semantics: The MD 1 asks the home server 12 with the SD-ID to react with a "home server data response" message.
Name: login request
Parameters:
   MD-ID
   loginData: data needed to use the relay service
Encrypted: yes (login data), with the public key of the relay service in order to keep the login data secret
Signed: yes, with the private key of the mobile device 1 in order to proof that this message came from the mobile device 1
Semantics: The MD 1 with the MD-ID asks the relay to log it onto the relay service, so, as a result, the mobile device can use this service after a successful login. The relay can react with a "login response" message.

Name: data send
Parameters:
   MD-ID
   SD-ID
   ChunkID
   <Complex list>: The list of media IDs and sequences of MediaIDs the mobile device has removed after transfer
   Data chunk
   checksum
Encrypted: yes (Data chunk), with the public key of the relay service in order to keep the chunk data secret
Signed: yes, with the private key of the mobile device 1 in order to secure this message
Semantics: The MD 1 with the MD-ID sends a data chunk with the corresponding ChunkID secured with the checksum (e.g. a CRC16 value) against transmission errors to a relay server 19 or a home server 12 with the SD-ID. Upon reception the relay server 19 can react with a "relay data response" message. When the home server 12 receives this message it can react with a "home server data response" message.
1.4 Messages from the Relay Server 19
   The messages that can be sent from the relay server 19 to the mobile device 1 under the control of the RS-ALM 24 are the following ones.
Name: I am here
Parameters:
   SD-ID: the SD-ID of the relay server 19
   Type: set to "Relay". The type of device at this end.
   Login: information about whether login is needed/possible
      "required"
      "optional"
      "no login possible"
   Operator: string describing the operator
   Advertisement policy: information about whether and when ads will be inserted
      "no ads"
      "No ads when logged in"
      "Ads will be added"
   Contact web site
      URL referring to a web site that might be even tailored to the mobile device 1. This web site could contain usage policies, an access to the data recordings the relay server 19 was not able to deliver to the home server 12 yet, etc.
Encrypted: yes (Contact web site), with the public key of the mobile device in order to keep the contact web site secret
Signed: yes, with the private key of the relay server 19 in order to authenticate this message
Semantics: This is the message a relay server 19 can react upon "RSVP" or "Are you there?" messages send by mobile device 1. The "Login" parameter specifies whether a valid login is required in order to use this relay server 19. The "Operator" parameter refers to the party that operates this relay server 19. The "Advertisement policy" specifies whether this relay server 19 will insert ads into the set of recorded media in order to compensate for the usage of its service.
Name: login response
Parameters:
   result: "accepted" or "denied"
   reason:
      "login ok"
      "no login needed"
      "login data not accepted"
Signed: yes, with the private key of the relay server 19 in order to authenticate this message Semantics: The relay server 19 answers the "login request" message of the MD. If the result is "denied" the MD can expect that the relay server 19 will not accept "data send" messages, i.e. store or relay them to the home server 12.
Name: relay data response
Parameters:
   received: <complex list>
   received with errors: <complex list>
   home server reached?: "yes" or "no"
Signed: yes, with the private key of the relay in order to authenticate this message
Semantics: The relay server 19 gives the mobile device 1 some feedback with this message on what chunks the relay server 19 claims to have received error-free and with errors. In addition it informs the mobile device 1 whether the relay server 19 could already reach the home server 12 or not.
Name: ads data send
Parameters:
   SD-ID 1
   SD-ID 2
   ChunkID
   Data chunk
   checksum
Signed: yes, with the private key of the relay server 19 in order to secure this message
Semantics: The relay server 19 with the SD-ID 1 sends a data chunk with the corresponding ChunkID secured with the checksum (e.g. a CRC16 value) against transmission errors to a home server 12 with the SD-ID 2.
1.5 Messages from the Home Server 12
The messages that can be sent from the home server 12 to the mobile device 1 under the control of the HS-ALM 13 are the following ones.
Name: I am here
Parameters:
   SD-ID: the SD-ID of the Home Server 12
   Type: set to "Home Server". The type of device at this end.
Signed: yes, with the private key of the home server 12 in order to authenticate this message
Semantics: This is the message a home server 12 can react upon "RSVP" or "Are you there?" message send by mobile device 1.
Name: home server data response
Parameters:
   SD-ID: the SD-ID of the home server 12
   received: <complex list>
   received with errors: <complex list>
Signed: yes, with the private key of the home server 12 in order to authenticate this message
Semantics: The home server 12 with the SD-ID gives the mobile device 1 some feedback with this message on what chunks the home server 12 has received error-free and with errors. The data entity "complex list" is the same as above. Please note that the home server 12 does not have to react on every "data send" message with one "home server data response"—it could also e.g. collect a number of "data send" messages and react then thus saving some messages.
1.6 Different Flows
a) Association of Mobile Device 1 and Home Server 12
Before we will now have a look on typical message flows, we look into a typical pairing scenario between a mobile device 1 and a home server 12 that establishes an association or allocation between both devices. This association mainly exchanges configuration data between mobile device 1 and home server 12. It can in principle use any communication unit, e.g. a wireless network, a USB connection or even a mobile data memory module configured at the home server 12 and read at the mobile device 1. After the association the mobile device 1 knows:
   SD-ID of the home server 12
   Public key of the home server 12
   The network id of the of the wireless connection the home server 12 is a member of (e.g. the network name of a WLAN)
   The network access data of the of the wireless connection the home server 12 is a member of (e.g. the secret key of a WLAN)
After the association the home server 12 knows:
   MD-ID of the mobile device 1
   Public key of the mobile device 1
   File system location where to store upcoming media
b) The Mobile Device 1 Thinks it Finds Some Wireless Network, but there is No Such Thing at this Location
The mobile device 1 issues a "RSVP" message because the wireless network is not recognized. As there is in fact no network, no one answers this message. The mobile device 1 issues the "RSVP" message every FINDINTERVALL [ms] as long as FINDPERIOD [ms]. As it did not get an answer during this period, the mobile device 1 stops the LTP.
c) The Mobile Device 1 Finds a Wireless Network, but this One is of No Use
The mobile device 1 issues a "RSVP" message because the wireless network is not recognized. There is such a network, but there is no relay server 19 or home server 12 in it, so the message remains unanswered. As in case 1) the mobile device 1 stops the LTP after FINDPERIOD [ms].
d) The Mobile Device 1 Finds the Wireless Network Containing the Home Server 12
The mobile device 1 issues an "Are you there?" message using the SD-ID of the home server 12 because it recognizes the wireless network. The home server 12 answers with an "I am here" message. The mobile device 1 verifies the identity of the home server 12 by verifying the signature of the message and continues only if this is the associated home server. The mobile device 1 now starts data transfer by issuing series of "data send" messages for those data chunks it does not have an acknowledgement of the home server 12 for. The home server 12 processes also only messages from those mobile devices 1 that have been associated before. From time to time the home server 12 sends a "home server data response" message to the mobile device 1, thus acknowledging one or a series of these data chunks to the mobile device 1. Please note that these messages do not acknowledge single data chunks, but always reflect all data chunks that have been stored safely at the home server 12 and that stem from that mobile device 1.
e) The Mobile Device 1 Finds a Wireless Network with a Willing Relay Server 19 in it
The mobile device 1 issues a "RSVP" message because the wireless network is not recognized. The relay server 19 answers with an "I am here" message. The mobile device 1 now starts data transfer by issuing series of "data send" messages for those data chunks it does not have an acknowledgement of the home server 26 for. From time to time the relay server 19 sends a "relay data response" message to the mobile device 1, thus acknowledging one or a series of these data chunks to the mobile device 1. Please note that also these messages do not acknowledge single data chunks, but always reflect all data chunks that have been stored at the relay server 19 for this mobile device 1. The mobile device 1 does not consider these messages authoritative as only the home server 26 can authoritatively acknowledge chunks. Therefore it can be the case that the relay server 19 relays "home server data response" messages from the home server 26 to the mobile device 1. Please note that neither there is a must that a relay server 19 receives such messages from the home server 26 during the course of the connection to the mobile device 1 as the home server 26 might e.g. be unavailable at that time. Nor do the relayed messages need to relate to the chunks sent to the current relay server 19—in fact it might be more likely that the "home server data response" messages relate to chunks that have been sent by a former connection to possibly a different relay server 19.

f) The Transfer of Data Between Mobile Device 1 and a Home Server 12/Relay Server 19 is Interrupted When the transfer is interrupted the mobile device 1 gets informed by the wireless module 7 about this event (this assumption is very likely as the wireless communication needs to be two-way anyways). The mobile device 1 stops sending "data send" messages. However, it considers itself still to be connected logically to the relay server 19/home server 12 in a time period called CONNECTIONTIMEOUT-PERIOD. If the wireless module 7 does not signal another wireless connection event during this period, the mobile device 1 considers itself disconnected and stops the LTP. If the wireless module 7 signals another wireless connection, the mobile device 1 continues sending "data send" messages. At the same time the mobile device 1 tries to confirm the existence of the relay server 19/home server 12 that was the other end of the former wireless connection by "Are you there?" messages using the SD-ID of the relay server 19/home server 12 every FINDINTERVALL [ms] mixed into the "data send" messages stream. If the message is not answered during FINDPERIOD [ms] the LTP is stopped as in case 3). If another suitable relay server 19 is answering the message, the mobile device 1 reacts as if the communication was just established with the new relay server 19. This basically unit that subsequent "data send" messages will be addressed to the new relay server 19. When the transfer is interrupted also the relay server 19 or the home server 12 gets informed. However, in this case no actions need to be taken.

g) One Media Item has been Transferred Completely

As soon as the home server 12; 26 has received all chunks of a data or media item it will try to inform the mobile device 1 about that fact in the next couple of "home server data response" messages with a corresponding confirmation message. If the mobile device 1 receives at least one of these messages it deletes the media item from its memory. If the mobile device 1 did not receive one of these messages it will continue sending chunks of this media item to the home server 12; 26. As soon as the home server 12; 26 notices this, it will inform the mobile device 1 using the next couple of "home server data response" messages. This iteration continues until the mobile device 1 finally receives at least of these messages.

h) The Transfer Between a Mobile Device 1 and a Home Server 12; 26/Relay Server 19 is Ended Because all Media has been Transferred As soon as the mobile device 1 states that there are no more media items to transfer (because all of them have been removed or their transfer has been acknowledged by the home server), the mobile device 1 stops the LTP.

1. In the Following, an Example Description of the Remote Transfer Protocol (RTP) is Given.

The remote transfer protocol is the system that allows to transfer data recordings from the relay server 19 to the home server 26.

The RTP is a message-based stateless protocol. Every message is allowed at every point of time. The RTP is based on the LTP and uses its data structures and messages.

The following principles govern RTP:
a) The relay server 19 collects some messages (see Section 1.7) from the mobile device 1 addressed to the home server 26.
b) The relay server 19 reads the readable fields of the messages and can use them for its purpose
c) The relay server 19 tries to contact the home server 26 when it gets messages addressed to the home server 26.
  c1) In case the home server 26 can be contacted the messages are delivered to the home server 26
  c2) In case the messages cannot be delivered they are stored for some time. If the home server 26 cannot be contacted during this time the messages will be deleted.
d) The home server 26 reacts with messages upon getting a message (see section 1.8).
e) The relay server 19 tries to send these messages back to the mobile device 1
  e1) In case the mobile device 1 can be contacted the messages are delivered to the mobile device 1
  e2) In case the mobile device 1 cannot be contacted (e.g. because the mobile device 1 already went out of range of the relay server 19) it is up to the relay operator to use a strategy. Such strategies could include:
    i. The messages are simply deleted
    ii. The messages are stored somewhere in the operator's infrastructure, so they can be delivered faster the next time the mobile device 1 connects to a relay server 19 of this operator (if this is not the case the messages can be also deleted after some time)
    iii. The messages are stored at a number of relay serves of the operator, so they can be delivered immediately the next time the mobile device 1 connects to a relay of this operator (if this is not the case the messages can be also deleted after some time)
f) In addition to the messages relayed from the mobile device 1 to the home server 26 and the ones from the home server 26 to the mobile device 1 a few additional messages exist (see section 1.9).
g) In contrast to the LTP the RTP is a protocol to be typically used in a wide area network (WAN) at OSI layer 3. Therefore, the RTP will e.g. in case of the interne use a unicast whereas the LTP could (for some wireless networks based at OSI layer 2) sometimes use layer 2 broadcasts.

1.7 Messages from the Mobile Device 1

The following LTP messages from the mobile device 1 are relayed by the relay server 19 and then (maybe later on) sent to the home server 26: Therefore they are also elements of RTP. Please note that the relay server 19 wraps each of these message in a "relayed message" message (see section 1.9) with an additional data field in order to allow the home server 26 to distinguish the LTP from the RTP versions of these messages and to send these messages logically addressed to mobile device 1 physically to relay server 19.

Name: Where was I?
Name: data send 1.8 Messages from the Home Server 26

The following LTP messages from the home server 26 are relayed by the relay server 19 and then (maybe later on) sent to the mobile device 1: Therefore they are also elements of RTP. Please note that it is probably necessary to wrap these messages in an OSI layer 3 message as RTP will be typically based on layer 3 where LTP will be based typically on layer 2.

Name: I am here
Name: home server data response 1.9 Messages from the Relay Server 19

The additional messages not contained in LTP that can be sent from the relay server 19 to the home server 26 are the following ones.

Name: ads data send
Parameters:
SD-ID 1
SD-ID 2
ChunkID
Data chunk
checksum

Signed: yes, with the private key of the relay server 19 in order to secure this message
Semantics: The relay server 19 with the SD-ID 1 sends a data chunk with the corresponding ChunkID secured with the checksum (e.g. a CRC16 value) against transmission errors to a home server 26 with the SD-ID 2. The home server 26 reacts with a "home server data response" message.

Name: relayed message
Parameters:
SD-ID
<LTP message>

Signed: yes, with the private key of the relay server 19 in order to secure this message
Semantics: The relay server 19 relays a message from the mobile device 1 to the home server 26. The home server 26 should address its answer to the mobile device 1, but send it to the relay server 19 via the SD-ID.

Name: Are you there?

This message is the LTP message of the same name but used with a slightly different semantics. Instead of the mobile device 1 using this message to find a home server 12 in a local wireless connection the relay server 19 now uses this message in order to test whether a specific home server 26 is available pretending a mobile device 1 has sent this message (the availability can change quickly compared to the message latency in a wide area network. Therefore a reaction on this message establishes no guarantee that the next message the relay server 19 sends to the home server 26 will also be received). If the home server 26 is available it will send an "I am here" message the relay server 19 can read. It is up to the relay server 19 whether the "I am here" message is delivered to the mobile device 1 or deleted. As this message is a LTP message it also needs to be wrapped into a RTP "relayed message" message.

1.10 Different Flows a) The Relay Server 19 has Messages for the Home Server 26 but the Home Server 26 is not Online The relay server 19 issues a "Are you there?" LTP message wrapped in a "relayed message" RTP message that is then sent to the home server 26. To that end the global ID of the SD-ID parameter in the "Are you there?" message is used. Being e.g. a DNS name hinting to a dynamic DNS name space, the RTP message can be addressed at the IP address that is the result of the dynamic DNS name resolution. As in this flow the home server 26 is not online, no answer is generated. As a reaction the relay server 19 will typically issue this message periodically to the home server 26 until it is answered or until the relay server 19 decides to delete all messages to this home server 26.

b) The Relay has Messages for the Home Server and the Latter is Online

The relay server 19 issues a "Are you there?" LTP message wrapped in a "relayed message" RTP message that is then sent to the home server 26. To that end the global ID of the SD-ID parameter in the "Are you there?" message is used. Being e.g. a DNS name hinting to a dynamic DNS name space, the RTP message can be addressed at the IP address that is the result of the dynamic DNS name resolution. As in this flow the home server 26 is indeed online, it generates an "I am here" LTP message wrapped in a RTP message. This message is directed towards the mobile device 1, but sent to the relay server 19 identified by the SD-ID in the original RTP message that contained the "Are you there?" LTP message. The relay server 19 notices the answer and starts sending data messages to the home server 26.

c) The Relay Server 19 Relays a Data Recording to the Home Server 26

After having found the home server 26 being online (see flow 2) the relay server 19 starts sending the "data send" LTP messages it received from the mobile device 1. To that end the messages are wrapped into "relayed message" RTP messages sent to the home server 26. The home server 26 processes only those messages that stem from an associated mobile device 1. Upon reception the home server 26 generates from time to time "I am here" LTP messages wrapped into RTP messages addressed to the mobile device 1 but sent to the relay server 19. Upon reception of these messages the relay server 19 deletes the "data send" messages it stored containing the data chunks the home server 26 signalled to have received. Also, if the mobile device 1 is still in range, the relay server 19 sends the "I am here" LTP messages to the mobile device 1. As the relay server 19 sends "data send" messages to the home server 26 containing chunks that are parts of data recordings made by the mobile device 1 the relay server 19 may also adds "ads data send" messages containing the chunks of advertisements the user gets along the data recordings. The home server 26 answers these messages with "I am here" messages directed to the relay server 19.

2. Symmetric Vs. Asymmetric Cryptography

In order to describe the invention the mechanisms of asymmetric cryptography were used. However, also symmetric cryptography unit can be used instead.

The invention claimed is:

1. A mobile device for recording data, comprising:
   a recording unit adapted to record data,
   a memory unit adapted to store recorded data,
   a detecting unit adapted to automatically detect a wireless connection to a server adapted to receive said recorded data via a wireless communication system without any user interaction,
   a transmitting unit adapted to automatically transmit the recorded data to the server via said wireless communication system without any user interaction when said detecting unit detects said wireless connection to said server, and
   a receiving unit adapted to receive confirmation information via said wireless communication system confirming the receipt of said recorded data from said server, wherein said recorded data is deleted from said memory unit after the receipt of said confirmation information.

2. The mobile device according to claim 1,
   wherein said transmitting unit is adapted to repetitively transmit said recorded data until said confirmation information is received.

3. The mobile device according to claim 1,
   having an on mode in which the mobile device is powered on, and an off mode in which the mobile device is powered off completely, and a standby mode in which the detecting unit is able to detect wireless connection to said server, wherein all other functions of said mobile device are powered off in said standby mode.

4. The mobile device according to claim 3,
wherein the detecting unit is a wake-up module adapted to power up at least the transmitting unit in order to transmit said recorded data when detecting a wireless connection to said server via said wireless communication system.

5. The mobile device according to claim 1,
wherein said detecting unit is only powered on if said recorded data to be transmitted to said server is stored in said memory unit.

6. A server for receiving and recording data, comprising:
a receiving unit adapted to automatically receive recorded data from a mobile device via a wireless communication system, without any user interaction,
a memory unit adapted to store said recorded data received from said mobile device via said wireless communication system,
a transmitting unit adapted to transmit confirmation information confirming the receipt of said recorded data to said mobile device via said wireless communication system, and to transmit said recorded data stored in said memory unit via a wired or a wireless communication system to a specific server allocated to said mobile device, wherein
said receiving unit is adapted to receive confirmation information confirming the receipt of said recorded data from said specific server via said wired or wireless communication system after transmitting said recorded data to said specific server, and
said recorded data is deleted from said memory unit after receiving said confirmation information from said specific server.

7. The server according to claim 6,
wherein the communication with said mobile device bases on a local transfer protocol and the communication with said specific server bases on a remote transfer protocol.

8. The server according to claim 6,
being a specific server allocated to said mobile device and comprising confirmation unit adapted to provide said confirmation information after receiving said recorded data from said mobile device.

9. The server according to claim 8,
wherein the communication with said mobile device bases on a local transfer protocol.

10. A system for receiving and recording data, comprising:
a relay server including
  a receiving unit adapted to automatically receive data from a mobile device via a wireless communication system, without any user interaction,
  a memory unit adapted to store said recorded data received from said mobile device via said wireless communication system,
  a transmitting unit adapted to transmit confirmation information confirming the receipt of said recorded data to said mobile device via said wireless communication system, and to transmit said recorded data stored in said memory unit via a wired or a wireless communication system to a specific server allocated to said mobile device, wherein
  said receiving unit is adapted to receive confirmation information confirming the receipt of said recorded data from said specific server via said wired or wireless communication system after transmitting said recorded data to said specific server, and
  said recorded data is deleted from said memory unit after receiving said confirmation information from said specific server, and
said specific server including
  a receiving unit adapted to receive recorded data from said relay server via said wired communication system,
  a memory unit adapted to store said recorded data received from said relay server,
  a confirmation unit adapted to provide confirmation information confirming the receipt of said recorded data from said relay server, and
  a transmitting unit adapted to transmit said confirmation information to said relay server via said wired or wireless communication system.

11. The server according to claim 10,
wherein the communication with relay server bases on a remote transfer protocol.

* * * * *